United States Patent
Crowder et al.

(10) Patent No.: US 6,214,070 B1
(45) Date of Patent: Apr. 10, 2001

(54) DISK DRIVE FILTER

(75) Inventors: Mark S. Crowder, Broomfield, CO (US); David Fowler, San Jose, CA (US); Robert Turner, Thornton; Paul D. Mischo, Lyons, both of CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/356,525

(22) Filed: Jul. 19, 1999

(51) Int. Cl.[7] .......................... B01D 29/56; B01D 45/16; B01D 50/00
(52) U.S. Cl. ................ 55/320; 55/385.6; 55/486; 55/505; 360/97.2
(58) Field of Search .................... 55/320, 385.6, 55/486, 505, 508; 360/97.02, 97.03

(56) References Cited

U.S. PATENT DOCUMENTS

| | | | |
|---|---|---|---|
| 4,280,155 | * 7/1981 | Scott et al. | 360/97.03 |
| 4,633,349 | 12/1986 | Beck et al. | 360/97 |
| 4,684,510 | 8/1987 | Harkins | 423/210 |
| 4,863,499 | 9/1989 | Osendorf | 55/316 |
| 5,030,260 | 7/1991 | Beck et al. | 55/316 |
| 5,124,856 | 6/1992 | Brown et al. | 360/97.03 |
| 5,229,899 | 7/1993 | Brown et al. | 360/97.02 |
| 5,346,518 | 9/1994 | Baseman et al. | 55/267 |
| 5,367,417 | 11/1994 | Brown et al. | 360/97.02 |
| 5,417,743 | 5/1995 | Dauber | 96/13 |
| 5,447,695 | 9/1995 | Brown et al. | 422/171 |
| 5,507,951 | 4/1996 | Eckerd | 360/97.02 |
| 5,515,214 | 5/1996 | Kiyonaga et al. | 360/97.02 |
| 5,537,270 | 7/1996 | Morehouse et al. | 360/97.02 |

FOREIGN PATENT DOCUMENTS

| | | |
|---|---|---|
| 0 246 756 | 11/1987 | (EP) . |
| 2 198 280 | 6/1988 | (GB) . |
| 52-38909 | * 3/1977 | (JP) .................. 360/92.02 |
| W/O 94/11870 | 5/1994 | (WO) . |

* cited by examiner

*Primary Examiner*—David A. Simmons
*Assistant Examiner*—Robert A. Hopkins
(74) *Attorney, Agent, or Firm*—David M. Sigmond

(57) ABSTRACT

The filter assembly of the present invention provides protection to a data storage disk drive assembly from contaminants, including chemical gases and particles, that either enter or exit the disk drive assembly. Incoming gases and particles pass through a label, into a hard body filter, through a diffusion filter, contact the chemical adsorbent and pass into the drive interior through a particulate filter. Outgoing gases and particles go through the apparatus in reverse. The filter assembly may be installed from the outside of the disk drive assembly at a chosen location and at any point during or after manufacturing and testing. The filter assembly is held in place by lateral extensions and an adhesive label applied to the exterior mounting surface.

20 Claims, 2 Drawing Sheets

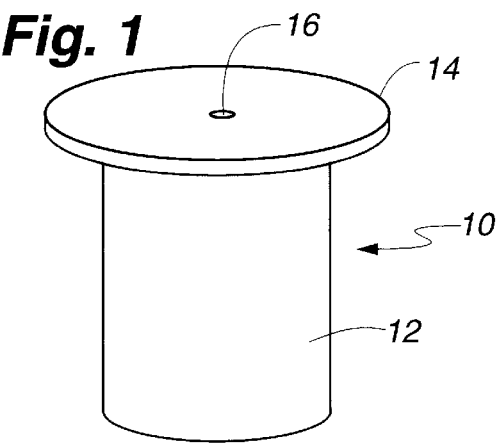
Fig. 1
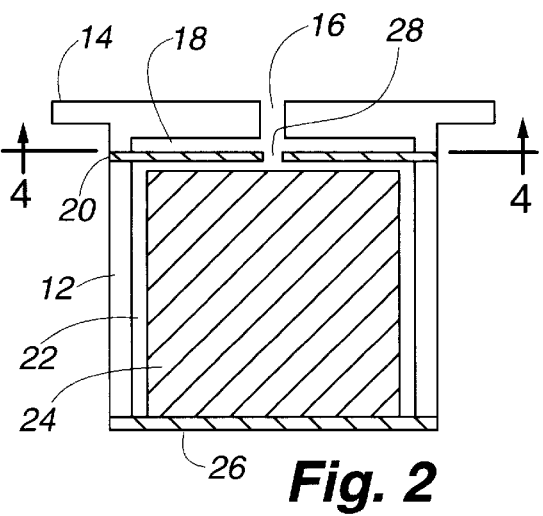
Fig. 2
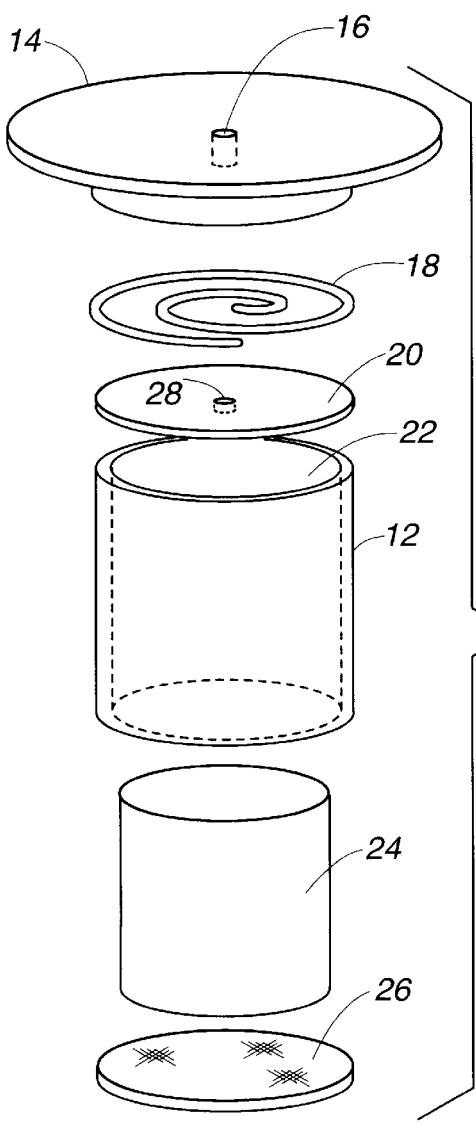
Fig. 3
Fig. 4
Fig. 5

DISK DRIVE FILTER

FIELD OF THE INVENTION

This invention generally relates to filters for disk based data storage systems, and more particularly, to multi-functional filter structures which can be installed and removed from the outside of an assembled disk drive without disassembling the drive and which can be reused after removal.

BACKGROUND OF THE INVENTION

A disk drive is a data storage device that stores data in concentric tracks on a disk shaped medium. Data is read from the medium by spinning the medium about a central axis while positioning a transducer near a desired track of the medium to sense the data. The transducer provides an electrical signal representative of the sensed data to data processing circuitry within the disk drive which converts the electrical signal to a format that is recognizable by an attached host unit. The converted data signal is then delivered to the host unit for use by it. Disk drives can store data in any of a number of different forms, such as magnetic data storage and optical data storage.

Disk drive units are enclosed within a housing to mitigate the effects of vapor, particulate and contamination on the workings of the drive. As can be appreciated, undesirable substances like these exist both inside and outside the disk drive housing and can have a deleterious effect on the operation of the drive. For example, particles and volatile gases can result in performance problems such as stiction between the transducer and the disk, creation of thermal asperities, and even transducer crashes. To reduce such occurrences, the level of airborne particles and gases within the disk drive housing should be kept low.

The environment inside a disk drive housing can be dynamic due to the creation of pressure gradients. Pressure gradients can be the result of heating or cooling, from internal or external sources, or the spinning up or down of the disks within the housing. As a result, convection may drive air out of or draw it into the drive housing through a predetermined path, such as through a filter and breather hole, or through undesirable paths such as leaks around gaskets and screw holes. In addition to contaminant movement by air flow or convection, contaminants may also be moved by diffusion. Diffusion is the time and temperature dependent transport of material in response to a chemical gradient. Diffusion may occur inside the drive or between the inside and outside of the drive depending upon the presence of a chemical gradient.

Filters have been designed to reduce the levels of undesired substances introduced into the housing of a disk drive, including multi-functional filters to filter undesired chemical vapors and particles. In many instances, these multi-functional filters are attached to the inside of the drive housing adjacent an opening in the cover or base plate. The filter is typically attached with an adhesive. In such a configuration, the reliability of the drive may be affected by the reliability of the adhesive joint connecting the filter to the inside of the drive housing. Failure of the adhesive may result in an influx of uncontrolled contamination and may potentially cause physical damage to the disk drive due to movement of the loose filter.

A specific example of a multi-functional filter for a disk drive assembly is disclosed in U.S. Pat. No. 5,030,260, issued Jul. 9, 1991, which discloses an intricate multi-piece filter assembly comprising a number of component layers through which incoming air is filtered, including external tape 25, diffusion plate 36, a first particulate filter 31, a first chemical adsorbent 33, a second chemical adsorbent 34, a second particulate filter 32, and bottom housing 30, including a second diffusion path 52 and bottom cover 39. However, there are numerous drawbacks associated with this design.

In particular, as the '260 patent is generally directed to a mainframe or other high end application, it does not recognize or address many issues resulting from the development of smaller and less expensive, yet more complicated and faster disk drive assemblies, particularly for use in smaller computers, such as personal computers, laptops and still smaller computers. For example, in a mainframe environment, disk drive assemblies are not to be subject to the rigorous form factor limitations of a disk drive assembly in a typical desktop, laptop or smaller computer. As shown in FIG. 3 of the '260 patent, at least a portion of the filter extends above the top cover of the disk drive assembly. This alignment would violate form factor requirements of maintaining a flush top cover surface in desktop, laptop and smaller computers. The '260 patent also discloses positioning the filter directly over the disk stack where very little space exists in a disk drive used in a personal computer.

Another drawback of the filter design disclosed in the '260 patent is that the filter is expressly designed to filter only incoming air and avoid filtering outgoing air and vapors, such as outgases from adhesives and the like. This one way restriction on air flow appears to be due to the limited size and capacity of the chemical adsorbent, perhaps due to its position above the disk stack where space is limited. Indeed, because of the limited size and capacity of the chemical adsorbent, the '260 patent discloses positioning a diffusion path on each side of the chemical adsorbent to inhibit diffusion and avoid premature depletion of the capacity of the chemical adsorbent.

Additionally, the '260 patent does not disclose a filter that can be removed and reused to accommodate reworking the disk drive assembly or to maximize the flexibility of the assembly and testing process. Because the diffusion paths appear to be positioned at the surface of the filter body, removing the outer tape seal to remove the filter to permit reworking of the drive would likely irreparably damage the diffusion path and require that the filter be replaced with a new filter. Moreover, many if not most commercial drives are electrically and mechanically tested before being shipped from the manufacturer. In certain circumstances, drives fail and must be reworked. In those instances, the drive must be opened and, as a result, the filter is exposed to a greater volume of air, without anything inhibiting diffusion. If unprotected, this causes a premature depletion of the chemical adsorbent capacity, potentially decreasing or reducing drive reliability if the filter is reused. Removing the filter further allows the cover to be cleaned, after testing but before commercial shipment, without damage to the filter or disassembly of the drive.

With the development of smaller, less expensive disk drive assemblies, a need exists for an improved multi-functional filter to clean interior and incoming air of vapors, particles and other contaminants. This filter is capable of installation at any time during the manufacturing process, including following testing and removal, and may be reused after rework of the disk drive assembly.

SUMMARY OF THE INVENTION

The present invention is directed to a multi-functional filter assembly for disk based data storage systems. A disk drive filter assembly of the present invention comprises a flange portion having a first cross-section and a bottom portion connected to the flange portion. The bottom portion has a chamber and a second cross-section, which is smaller in diameter than the diameter of the first cross-section. A breather hole, disposed in the flange portion, communicates with a diffusion path which, in turn, communicates with the chamber disposed on the bottom portion of the filter which, in turn, communicates with the surrounding interior air of the drive enclosure.

A further embodiment of the present invention is directed to a disk drive assembly comprising a housing, at least one disk for data recording, storage and/or retrieval, at least one transducer assembly to record and/or retrieve data, at least one motor assembly and a multi-functional filter assembly. The multi-functional filter assembly comprises a diffusion path for limiting the diffusion of vapors into the drive, a particulate filter and a chemical adsorbent within a unitary body. The unitary body comprises a housing, a flange, a breather hole through the top of the housing, a chamber, a diffusion path connecting the breather hole to the chamber and a particulate filter in communication with the chemical adsorbent.

Yet another embodiment of the present invention is directed to a method of installing a filter assembly into a disk drive housing, comprising the steps of forming an aperture on the surface of the disk drive housing, forming a recess adjacent to at least part of the aperture, inserting into the aperture a filter assembly comprising a housing, a flange, a breather hole through the top of the housing, a diffusion path disposed inside the filter assembly and connected to the breather hole, and a chamber connected to the diffusion path, applying a seal between the flange and the surface of the disk drive housing and applying a seal over at least part of the filter assembly.

BRIEF DESCRIPTION OF THE DRAWINGS

FIG. 1 is a perspective view of one embodiment of the filter of the present invention.

FIG. 2 is a cross-sectional side view of the filter shown in FIG. 1.

FIG. 3 is an exploded view of the filter shown in FIG. 1.

FIG. 4 is a top cross-sectional view of the filter shown in FIG. 1, taken along line 4—4, showing the diffusion path.

FIG. 5 is an alternative embodiment of the diffusion path shown in FIG. 4.

Figure 6:
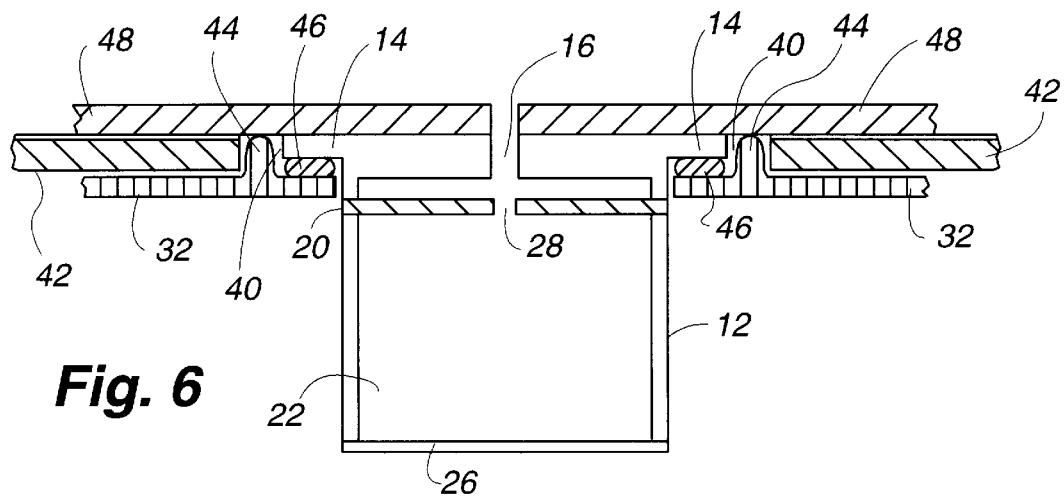
FIG. 6 is a cross-sectional view of the filter shown in FIG. 1 showing installation within the disk drive assembly.
Figure 7:
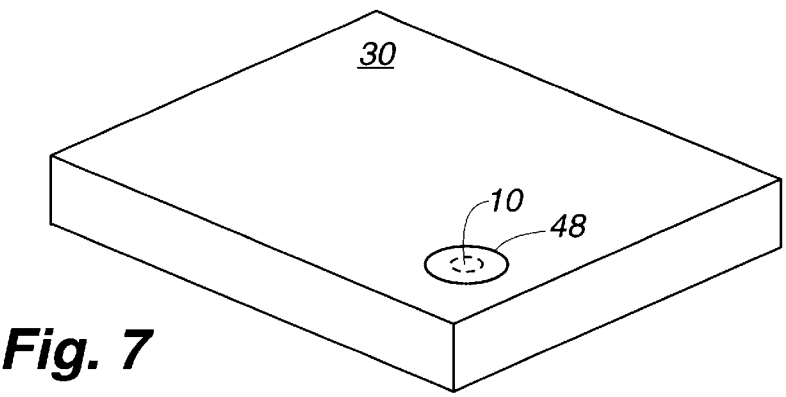
FIG. 7 is a perspective view of a disk drive assembly with the filter shown in FIG. 1 installed.

It should be understood that the drawings are not necessarily to scale. In certain instances, details which are not necessary for an understanding of the present invention or which render other details difficult to perceive may have been omitted. It should also be understood, of course, that the invention is not necessarily limited to the particular embodiments illustrated herein.

DETAILED DESCRIPTION OF INVENTION

One embodiment of the present invention is shown in FIGS. 1–4. A filter assembly 10 comprises outer shell 12, flange 14, breather hole 16, diffusion path 18, film seal 20, chemical adsorbent chamber 22, chemical adsorbent 24, and particulate filter 26. These components are preferably arranged in the manner shown in FIGS. 1–4, although other, alternative combinations of such components, and additional components, may be desirable for a given application. As described in more detail below, filter assembly 10 is preferably externally mounted, following the assembly of most, if not all, of the other components of the disk drive, and is particularly suited for filtering both air inside the disk housing and exterior air entering the disk housing.

Outer shell 12 preferably is a rigid, single piece housing composed of a suitable structural polymer, such as polycarbonate, that is injection moldable or otherwise formable into the desired shape and size. Outer shell 12 is sized to enclose the requisite components of the filter assembly 10 and provide sufficient quantity of the chemical adsorbent material to provide effective filtration and adsorbtion consistent with the expected life of the disk drive. Although outer shell 12 may be of any number of shapes and may be completely or partially enclosed, most preferably outer shell 12 is generally cylindrical, with a diameter of approximately 0.5 inches to 2.0 inches and has a height of approximately 0.10 to 1.0 inches.

Referring now to FIGS. 2 and 3, a breather hole 16 is provided in the outer shell 12 of filter assembly 10 to provide an opening through the top of filter assembly 10. The breather hole 16 provides a pathway into the filter assembly 10 for external air and out of the filter assembly for internal air. The breather hole 16 is in communication with a diffusion path 18. As would be appreciated by one skilled in the art, the diffusion path 18 can have a variety of shapes and can be planar or three dimensional, although the planar spiral shapes shown in FIGS. 4 and 5 are preferred. In addition, the diffusion path 18 is also preferably internally positioned and sealed below the surface of the outer shell 12 by a thin film 20, preferably mylar. With this configuration, the filter assembly 10 may be removed from the drive housing without damage to the diffusion path 18.

Filter assembly 10 further comprises a chemical adsorbent chamber 22 to house a chemical adsorbent 24. Chemical adsorbent chamber 22 is in communication with diffusion path 18 through one or more openings 28 in the film seal 20. As can be appreciated, the breather hole 16, diffusion path 18, openings 28, chemical adsorbent chamber 22 and chemical adsorbent 24 are designed to optimize the trade off between the desired rate of diffusion and the desired internal pressure. For example, the ratio of the cross-sectional area of the diffusion path to its length has a direct correlation to the diffusion rate and internal pressure of the drive housing. Similarly, the filter assembly 10 may include one or more breather holes 16, one or more diffusion paths 18 and one or more openings 28 in the film 20, all of which can be adjusted in size and shape to optimize diffusion and pressure.

A chemical adsorbent 24 is positioned within chemical adsorbent chamber 22. Chemical adsorbent 24 may be any of a variety of known and available adsorbents for disk drive assembly applications, and particularly for filtering the outgases and other vapors generated during the life span of a disk drive. The adsorbent 24 is formulated and processed to enable adsorbtion of organic and inorganic species, such as acid. Preferably, chemical adsorbent 24 is sized to the interior of chemical chamber 22 to allow air to flow around the adsorbent 24, which in turn allows the adsorbent 24 to filter the desired chemicals by absorbtion and/or adsorbtion.

The filter assembly 10 is open at its bottom end to facilitate original placement and replacement of chemical adsorbent 24 within chamber 22. In this manner, should a drive need reworking, the adsorbent 24 can be replaced following reworking to the extent its adsorbtion capacity has been depleted due to exposure to external air while the drive is open for reworking.

Filter assembly 10 also comprises a particulate filter 26 to filter dust and other particles from both incoming and outgoing air flow. Preferably, particulate filter 26 is fit to span the opening in the bottom of the outer shell 12 of the filter assembly 10 and may be attached to outer shell 12 in a variety of ways as would be known to a person of skill in the art. If the ability to replace the adsorbent 24 is desired, the particulate filter 26 may be snap fit into place, provided an air tight seal is obtained. Particulate filter 26 may be constructed of a variety of known and available materials for disk drive assembly applications, including electrostatic media or membrane, alone or in combination.

Figure 8:
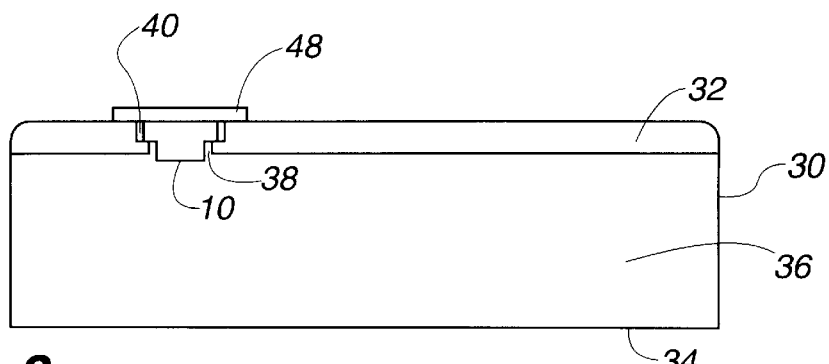
FIG. 8 is a front cross-sectional view of a disk drive assembly showing a filter of the type depicted in FIG. 1 installed.

As shown in FIGS. 2–3, each of the components are designed to fit into a single, composite filter assembly 10. The structure of filter assembly 10 allows it to be installed into a disk drive assembly 30 from the outside through the cover 32, base plate 34 or any outer wall 36. Referring to FIG. 8, the filter assembly 10 is inserted from the outside of a previously assembled disk drive assembly 30 through an aperture 38 in the top cover 32. The aperture 38 is sized to have close clearance with the main body of the outer shell 12, while the flange 14 nests in a recess 40 in the top cover 32, base plate 34 or outer wall 36. Alternatively, as shown in FIG. 6, the cover 32 may be flat and the recess 40 formed by a perimeter shoulder 44 formed in the top cover 32 around the circumference of the filter assembly 10. This configuration would typically be used in combination with a constrained layer damper 42 which consists of a rigid panel secured by an adhesive to the top cover 32. The shoulder 44 precludes the adhesive between the constrained layer damper 42 and top cover 32 from entering the drive housing.

Referring to FIGS. 1–2, a flange 14 extends laterally outward from and circumscribes the upper edge of the outer shell 12 to provide a structure to hold filter assembly 10 in a desired location within a disk drive assembly. Most preferably, flange 14 extends laterally around the circumference of the top of cylindrical outer shell 12 far enough to support the mass of the filter 10 and possibly far enough to provide a sealing surface between the interior and exterior. The height of flange 14 is preferably less than the recess in the top cover, base plate or outer wall, yet large enough to provide sufficient strength to keep the filter housing and flange from deforming under normal conditions. Flange 14 may comprise one or more separate pieces attached to outer shell 12, or preferably may be an integral part of a single piece, rigid outer shell 12.

Referring to FIG. 6, an adhesive or non-adhesive gasket 46 may be applied to the bottom of flange 14 to seal the aperture 38 against air leaks and to more securely attach the filter assembly 10 to the top cover 32, although the use of adhesive in this context would likely preclude reuse of the filter. An adhesive label 48 covers the exposed portion of the filter assembly 10, providing a seal and securing the filter assembly 10 to the disk drive assembly 30. Label 48 is constructed of a polymeric material, which does not restrict the incoming or outgoing air flow or diffusion through the filter.

The ability to externally install filter assembly 10 results in several advantages over other filter designs. For example, filter assembly 10 may be installed at any time during the manufacturing of the disk drive assembly 30, even after the disk drive assembly 30 is otherwise assembled, sealed and tested for defects. Filter assembly 10 may even be omitted from the disk drive assembly 30 altogether and installed, if at all, following testing, rework and quality assurance approval. In any event, manufacturing of the disk drive assembly 30 may be expedited and simplified by initially omitting installation of the filter assembly 10 until after the disk drive assembly 30 passes inspection, including the operation of the disk drive mechanism itself. The present design also eliminates the need to use adhesives inside the top cover employed by prior designs in which the filter is installed by adhesive to the inside of the cover. Installing filter assembly 10 at or near the end of the manufacturing process also prolongs the life of the filtering elements. Typically, chemical adsorbents of this kind are packaged in a sealed and protected environment. When the seal is opened, the chemical adsorbents begin to absorb and/or adsorb chemicals from the ambient air. As such, the chemical adsorbents typically must be installed within a sealed disk drive assembly within a short period of time. Here, the disk drive assembly 30 may be completely assembled, except for the filter assembly 10, before the chemical adsorbent is exposed. Following testing and approval, a single filter assembly 10, incorporating the chemical adsorbent 24, the particulate filter 26 and diffusion path 18 is simply fit into place in the top cover 32 of the disk drive assembly 30. This simplified, expedited manufacturing process limits the amount of time that chemical adsorbent 24 is directly exposed to ambient air.

In comparison to an internally installed filter assembly, filter assembly 10 cannot dislodge into the interior of the disk drive assembly 30, since flange 14 supports filter assembly 10 within the aperture 38 in the exterior wall 36 of the disk drive assembly 30. In addition, adhesive label 48 and/or adhesive on the bottom of flange 14 secures the filter to the housing, but the adhesive is positioned outside the drive housing.

In several ways, filter assembly 10 also facilitates rework of the disk drive assembly 30 and allows chemical adsorbent 24 to be replaced. For example, label 48 is adhered to the top surface of outer shell 12 and to the top cover 32 of the filter assembly 10. Peeling off label 48 during rework is less likely to damage the components of filter assembly 10, since label 48 is adhered to a rigid, structural piece and the diffusion path 18, film seal 20 and chemical adsorbent 24 are inside the filter assembly 10.

Filter assembly 10 provides flexibility in choosing the location of the filter assembly 10 within the disk drive assembly 30, particularly because it may be externally installed. For example, it may be desirable to mount filter assembly 10 to avoid external contamination areas such as the printed circuit board assembly, damping foams and adhesives. The present filter assembly 10 may be mounted in any location which takes advantage of internal pressure gradients and low pressure regions. By varying the size and shape of the component pieces, the overall size and shape of the filter assembly 10 may be varied to facilitate its placement in the drive to accommodate space limitations. The unitary filter assembly 10 may also be located to improve the acoustic performance of the top cover 32. Simply stated, the size and mass of filter assembly 10 can be optimized to achieve the desired result.

Externally mounting the filter assembly 10 on the top cover 32, base plate 34 or outer wall 36 of the disk drive assembly 30 also provides the option of locating the filter assembly 10 away from the disk stack. This allows the filter assembly 10 to be larger and thereby to drop further into the body of the disk drive assembly 30. A larger filter assembly 10 allows larger filtering elements, which in turn increases the capacity, life, performance and role of the filtering elements. For example, the greater capacity of the filtering elements allows filter assembly 10 to facilitate air flow and diffusion, particularly air flow and diffusion from the interior of the disk drive assembly 30.

The foregoing description of the present invention has been presented for purposes of illustration and description. The description is not intended to limit the invention to the forms disclosed herein. Consequently, variations and modifications commensurate with the above teachings, and the skill or knowledge of the relevant art, are within the scope of the present invention. The embodiments described herein are further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A filter for use in a disk drive assembly for removing particles, vapors, and other contaminants from air traveling into and out of the disk drive, comprising:

an integral housing having a first portion and a second portion, said first portion having a width greater than the second portion;

a breather hole disposed on the outer surface of said first portion;

a diffusion path disposed within said housing and below the surface of said first portion and in air flow communication with said breather hole;

said second portion having a chamber, said chamber containing a chemical adsorbent and said chamber in air flow communication with said diffusion path; and a particulate filter disposed on said second portion and in air flow communication with said chamber;

wherein air entering the disk drive assembly from outside travels through the breather hole, travels through the diffusion path, contacts the chemical adsorbent and travels through the particulate filter before entering the disk drive assembly.

2. The disk drive filter of claim 1, wherein:

the greater width of said first portion creates a flange which mates to a top cover of a disk 3 drive; and the second portion extends through an aperture in the top cover of the disk drive.

3. The disk drive filter of claim 1, wherein a film is disposed between said diffusion path and said chamber, and said film has at least one opening to allow air to move between said diffusion path and said chamber.

4. A hard disk drive, comprising:

a housing including a base plate, compatible cover and outer wall, one of said cover, base plate or outer wall having an aperture;

a motor affixed to said base plate and having a spindle at least partially disposed within said housing;

at least one disk disposed on and rotatable about said spindle; and a filter for removing particulate and vapors from air entering and exiting said housing, said filter inserted through said aperture from outside said housing and having a flange portion larger than said aperture such that said flange portion creates a substantially flush surface with the exterior of said housing, said flange portion further having a breather hole, said filter further having a second portion disposed beneath said flange portion and said second portion having a chamber containing a chemical adsorbent in air flow communication with said breather hole.

5. The hard disk drive of claim 4, wherein said second portion has a width less than the width of the flange portion.

6. The hard disk drive of claim 4, further comprising a particulate filter disposed within said second portion and in air flow communication with said chamber.

7. The hard disk drive of claim 4, wherein said filter further comprises a diffusion path disposed between said breather hole and said chamber.

8. The hard disk drive of claim 7, wherein an adhesive label is placed over said aperture and filter to secure said filter in place.

9. A removable and reusable filter for a hard disk drive, comprising:

an integral housing having a first portion and a second portion, said first portion having a width greater than the second portion;

a breather hole disposed on the outer surface of said first portion;

a diffusion path disposed within said first portion and in air flow communication with said breather hole;

said second portion having a chamber, said chamber containing a chemical adsorbent and said chamber in air flow communication with said diffusion path; and a particulate filter disposed on said second portion and in air flow communication with said chamber;

wherein air entering the disk drive assembly from outside travels through the breather hole, the diffusion path, the chamber and the particulate filter before entering the disk drive assembly.

10. A hard disk drive having an externally removable filter, comprising:

a housing including a base plate and compatible cover, said cover having an aperture;

a motor affixed to said base plate and having a spindle at least partially disposed within said housing;

at least one disk disposed on and rotatable about said spindle; and a filter for removing particulate and vapors from air entering and exiting said housing, said filter inserted through said aperture and having a flange portion larger than said aperture such that said flange portion rests with said cover to close said aperture, said flange portion further having a breather hole, said filter further having a second portion disposed beneath said flange portion, and said second portion having a chamber containing a chemical adsorbent in air flow communication with said breather hole.

11. A method for assembling a hard disk drive, comprising:

(a) mounting a spindle, spindle motor and at least one disk to a base plate;

(b) mounting an actuator and transducer to said base plate such that said transducer is positionable proximate the surface of said disk;

(c) mounting a printed circuit board to said base plate and connecting said printed circuit board to said spindle motor, actuator and transducer;

(d) affixing a cover to said base plate, said cover and base plate forming a housing for the disk drive;

(e) forming an aperture in said housing to receive a filter;

(f) sealing the hard disk drive except for sealing the aperture:

(g) inspecting the operation of the hard disk drive;

(h) providing quality assurance approval for the hard disk drive; then (i) placing a filter in said aperture from outside the disk drive housing; and (j) sealing said aperture to inhibit air flow around said filter.

12. The method of claim 11, including completely assembling the hard disk drive except for the operations recited in steps (i) and (j) before step (i).

13. A method for assembling a hard disk drive, comprising:

(a) mounting a spindle, spindle motor and at least one disk to a base plate:

(b) mounting an actuator and transducer to said base plate such that said transducer is positionable proximate the surface of said disk;

(c) mounting a printed circuit board to said base plate and connecting said printed circuit board to said spindle motor, actuator and transducer;

(d) affixing a cover to said base plate, said cover and base plate forming a housing for the disk drive;

(e) forming an aperture in said housing to receive a filter;

(f) inspecting the operation of the hard disk drive; then (g) placing a filter in said aperture from outside the disk drive housing; and (h) sealing said aperture to inhibit air flow around said filter.

14. A method for assembling a hard disk drive, comprising:

(a) mounting a spindle, spindle motor and at least one disk to a base plate;

(b) mounting an actuator and transducer to said base plate such that said transducer is positionable proximate the surface of said disk;

(c) mounting a printed circuit board to said base plate and connecting said printed circuit board to said spindle motor, actuator and transducer;

(d) affixing a cover to said base plate, said cover and base plate forming a housing for the disk drive;

(e) forming an aperture in said housing to receive a filter;

(f) sealing the hard disk drive except for sealing the aperture; then (g) placing a filter in said aperture from outside the disk drive housing; and (h) sealing said aperture to inhibit air flow around said filter.

15. A method for assembling a hard disk drive, comprising:

(a) mounting a spindle, spindle motor and at least one disk to a base plate;

(b) mounting an actuator and transducer to said base plate such that said transducer is positionable proximate the surface of said disk;

(c) mounting a printed circuit board to said base plate and connecting said printed circuit board to said spindle motor, actuator and transducer;

(d) affixing a cover to said base plate, said cover and base plate forming a housing for the disk drive;

(e) forming an aperture in said housing to receive a filter:

(f) testing the hard disk drive for defects; then (g) placing a filter in said aperture from outside the disk drive housing; and (h) sealing said aperture to inhibit air flow around said filter.

16. A method for assembling a hard disk drive, comprising:

(a) mounting a spindle, spindle motor and at least one disk to a base plate;

(b) mounting an actuator and transducer to said base plate such that said transducer is positionable proximate the surface of said disk;

(c) mounting a printed circuit board to said base plate and connecting said printed circuit board to said spindle motor, actuator and transducer;

(d) affixing a cover to said base plate, said cover and base plate forming a housing for the disk drive;

(e) forming an aperture in said housing to receive a filter;

(f) reworking the hard disk drive; then (g) placing a filter in said aperture from outside the disk drive housing; and (h) sealing said aperture to inhibit air flow around said filter.

17. A method for assembling a hard disk drive, comprising:

(a) mounting a spindle, spindle motor and at least one disk to a base plate;

(b) mounting an actuator and transducer to said base plate such that said transducer is positionable proximate the surface of said disk;

(c) mounting a printed circuit board to said base plate and connecting said printed circuit board to said spindle motor, actuator and transducer;

(d) affixing a cover to said base plate, said cover and base plate forming a housing for the disk drive;

(e) forming an aperture in said housing to receive a filter;

(f) providing quality assurance approval for the hard disk drive; then (g) placing a filter in said aperture from outside the disk drive housing; and (h) sealing said aperture to inhibit air flow around said filter.

18. A method for assembling a hard disk drive, comprising:

(a) mounting a spindle, spindle motor and at least one disk to a base plate;

(b) mounting an actuator and transducer to said base plate such that said transducer is positionable proximate the surface of said disk;

(c) mounting a printed circuit board to said base plate and connecting said printed circuit board to said spindle motor, actuator and transducer;

(d) affixing a cover to said base plate, said cover and base plate forming a housing for the disk drive;

(e) forming an aperture in said housing to receive a filter;

(f) completely assembling the hard disk drive except for placing a filter in the aperture and sealing the aperture;

(g) testing the operation of the hard disk drive; then (h) placing the filter in said aperture from outside the disk drive housing; and (i) sealing said aperture to inhibit air flow around said filter.

19. The method of claim 18, including reworking the hard disk drive before step (h).

20. The method of claim 18, including providing quality assurance approval for the hard disk drive before step (h).

* * * * *